United States Patent
Pickrell et al.

(10) Patent No.: US 6,592,787 B2
(45) Date of Patent: Jul. 15, 2003

(54) POROUS ARTICLES AND METHOD FOR THE MANUFACTURE THEREOF

(75) Inventors: Gary R. Pickrell, Blacksburg, VA (US); Kenneth R. Butcher, Hendersonville, NC (US); Chi Li Lin, Weaverville, NC (US)

(73) Assignee: Porvair Corporation, Hendersonville, NC (US)

( * ) Notice: Subject to any disclaimer, the term of this patent is extended or adjusted under 35 U.S.C. 154(b) by 143 days.

(21) Appl. No.: 09/801,044

(22) Filed: Mar. 7, 2001

(65) Prior Publication Data

US 2001/0046608 A1 Nov. 29, 2001

Related U.S. Application Data

(63) Continuation-in-part of application No. 08/825,629, filed on Mar. 31, 1997, now Pat. No. 6,210,612.

(51) Int. Cl.[7] .......................... B29C 67/20; B28B 1/24; B28B 1/26; B28B 3/00; B28B 3/20
(52) U.S. Cl. ........................ 264/44; 264/86; 264/638; 264/645; 264/651; 501/80; 501/81
(58) Field of Search ................... 264/44, 638, 645, 264/651, 86; 501/80, 81

(56) References Cited

U.S. PATENT DOCUMENTS

| | | |
|---|---|---|
| 2,797,201 A | 6/1957 | Veatch et al. |
| 2,996,389 A | 8/1961 | Fernhof |
| 3,888,691 A | 6/1975 | Villani et al. |
| 3,892,580 A | 7/1975 | Messing |
| 3,899,555 A | 8/1975 | Takao et al. |
| 4,056,586 A | 11/1977 | Pryor et al. |
| 4,307,051 A | 12/1981 | Sargeant et al. |

FOREIGN PATENT DOCUMENTS

| | | |
|---|---|---|
| DE | 42 08 155 A1 | 9/1963 |
| DE | 31 03 749 A | 8/1982 |
| DE | 31 03 751 A1 | 8/1982 |
| EP | 0 598 783 B1 | 12/1995 |
| GB | 1005437 | 9/1965 |
| JP | 57-98641 | 6/1982 |
| JP | 62-170440 | 7/1987 |

OTHER PUBLICATIONS

Document No. PCT/US98/06269, WO98/43927, published Oct. 8, 1998, WOX.
Ichinose N., Introduction to Fine Ceramics, Keytc, Great Britain, 1983, pp. 18–20 No Month.
Notification of Transmittal of International Search Report for PCT/US98/06269, mailed Nov. 25, 1998.
Document Pub. No. JP3228883, published Oct. 9, 1991, Patent Abstracts of Japan.
Document Appl. No. JP900022846, published Jan. 31, 1990.
Communication Relating to the Results of Partial International Search for PCT/US98/06269.
Doc. No. WO 93/04013, PCT/GB92/01493, published Mar. 4, 1993, WOX.
Doc. No. 07232974, Published Sep. 5, 1995, Appl. No. 06045223, Published Feb. 14, 1994, Patent Abstracts of Japan.

Primary Examiner—John J. Zimmerman
Assistant Examiner—Jason L Savage
(74) Attorney, Agent, or Firm—Carter, Schnedler, & Monteith

(57) ABSTRACT

An improved porous article and a method for forming such porous article are provided. A mixture of ceramic or metal particles and pliable organic hollow spheres is prepared in a liquid, typically as a suspension. The article is formed by pressing, slip casting, extruding or injection molding the mixture. The article is dried to remove the liquid, and then is fired so that the particles are bonded such as by sintering, and the organic spheres are eliminated, resulting in a strong porous article having uniformly spaced interconnected voids.

46 Claims, 1 Drawing Sheet

U.S. PATENT DOCUMENTS

| | | |
|---|---|---|
| 4,357,165 A | 11/1982 | Helferich et al. |
| 4,404,291 A | 9/1983 | Kiefer et al. |
| 4,432,798 A | 2/1984 | Helferich et al. |
| 4,565,571 A | 1/1986 | Abbaschian |
| H48 H | 4/1986 | Heichel |
| 4,666,867 A | 5/1987 | Beall et al. |
| 4,707,311 A | 11/1987 | Okazaki |
| 4,775,598 A | 10/1988 | Jaeckel |
| 4,777,153 A | 10/1988 | Sonuparlak et al. |
| 4,812,424 A | 3/1989 | Helferich et al. |
| 4,814,300 A | 3/1989 | Helferich |
| 4,839,049 A | 6/1989 | Kinney, Jr. et al. |
| 4,846,906 A | 7/1989 | Helferich et al. |
| 4,871,495 A | 10/1989 | Helferich et al. |
| 4,878,947 A | 11/1989 | Helferich |
| 4,889,670 A | 12/1989 | Gurak et al. |
| 4,917,857 A | 4/1990 | Jaeckel et al. |
| 4,923,487 A | 5/1990 | Bogart et al. |
| 4,963,515 A | 10/1990 | Helferich |
| 4,976,760 A | 12/1990 | Helferich et al. |
| 4,999,101 A | 3/1991 | Tadayon |
| 5,045,511 A | 9/1991 | Bosomworth et al. |
| 5,110,675 A | 5/1992 | Newkirk |
| 5,171,720 A | 12/1992 | Kawakami |
| 5,279,737 A | 1/1994 | Sekhar et al. |
| 5,318,797 A | 6/1994 | Matijević et al. |
| 5,382,456 A | 1/1995 | Hocking et al. |
| 5,441,919 A | 8/1995 | Park et al. |
| 5,443,603 A | 8/1995 | Kirkendall |
| 5,456,833 A | 10/1995 | Butcher et al. |
| 5,466,400 A | 11/1995 | Pujari et al. |
| 5,563,106 A | 10/1996 | Binner et al. |
| 5,563,212 A | 10/1996 | Dismukes et al. |
| 5,571,848 A | 11/1996 | Mortensen et al. |
| 5,580,832 A | 12/1996 | Malghan et al. |
| 5,937,641 A | 8/1999 | Graham et al. |
| 6,210,612 B1 | 4/2001 | Pickrell et al. |
| 6,235,665 B1 | 5/2001 | Pickrell et al. |

POROUS ARTICLES AND METHOD FOR THE MANUFACTURE THEREOF

RELATED APPLICATION

This is a continuation-in-part of U.S. patent application Ser. No. 08/825,629, now U.S. Pat. No. 6,210,612 filed Mar. 31, 1997.

BACKGROUND OF THE INVENTION

This invention relates to the formation of porous articles. More particularly, it relates to the formation of porous ceramic articles and porous metal articles.

In the production of certain articles for use in many applications, such as refractory, kiln furniture, filtration, fuel cell, bone implant, catalyst substrates, catalysts, particular traps, filters, diffusion layers, electrical conductors, heat exchange components, wicks for heat pipes, wicks for burners, radiant burner surfaces, diffusion layers for introducing fuel and/or water into an air stream. It is sometimes desirable to reduce the overall density of the fabricated article by introducing porosity into the article during or after fabrication. The strategy employed for reducing the mass of the article after fabrication usually involves removal of material from the article by means of grinding, drilling, routing or other mechanical methods to physically remove material from selected locations. This usually takes the form of drilling holes, routing channels, etc. Reducing the mass of the material (per unit volume of space occupied by the fabricated article) during fabrication involves using a process which introduces porosity into the material. This can be accomplished by various methods described in the literature.

Some of the basic patents assigned to Selee Corporation, assignee of the present invention, disclose a method to produce a ceramic foam article with a high volume percent interconnected porosity by impregnating a reticulated polyurethane foam with a ceramic slurry, made primarily from ceramic powder, a binder and water, and heating the impregnated polyurethane foam to burn of the polymer and sinter the ceramic. This method can be used to produce various pore sizes and densities. The reported strengths for various ceramic materials fabricated in this manner lie in the 100–700 psi range.

Another method to produce low density ceramic kiln furniture is taught in U.S. Pat. No. 4,812,424, whereby a porous aluminosilicate refractory aggregate is fired. The aluminum metal, alkali silicate and alkali aluminate chemical reaction producing a large volume of small gas bubbles is combined with a sodium silicate-sodium aluminate hydrogel setting reaction which traps the hydrogen gas bubbles in the ceramic. The strengths of this material are approximately in the 500–1000 psi range.

U.S. Pat. Nos. 4,814,300, 4,846,906, 4,871,495, 4,878,947, 4,923,487, 4,963,515 and 4,976,760 are extensions of this basic technology to include membranes and are used in specific markets, such as diesel particulate traps and diesel filters.

European Patent Specification Publication No. EP 0 598 783 B1 discloses a method of preparing porous refractory articles by forming a dispersion comprising particles in a liquid carrier, introducing gas into the dispersion and removing the liquid carrier to provide a solid article having pores derived from the bubbles.

U.S. Pat. No. 4,889,670 discloses a method to produce porous ceramic parts by combining a mixture of 60–90 weight percent of a particulate ceramic with 10–40 weight percent of a latex polymer, whereby the mixture is frothed by mechanical means, shaped, set and sintered to produce the porous article.

It is also well known that porosity can be introduced into a ceramic article by incorporating various types of organic particles into the ceramic body. Upon firing, these particles are oxidized and leave behind voids in the material.

Porous metal foam articles have been developed by Astro Met, Inc., of Cincinnati, Ohio, and are disclosed in U.S. Pat. No. 5,937,641, issued to Graham et al. Porous metal foam articles are made using a process which is similar to the process used by SELEE Corporation in manufacturing its ceramic foam articles, however, the ceramic powder is replaced with metal powder as a starting material. The Graham patent discloses that the porous metal foam may be used as a catalytic core element or a catalytic element for a catalytic converter.

OBJECTS OF THE INVENTION

It is, therefore, one object of this invention to provide improved porous articles which are stronger, more thermally shock resistant, possesses uniformly dispersed and highly controlled pore sizes, and which can be made more quickly and economically than presently available materials, such as foam materials.

It is another object of this invention to provide an improved method to produce ceramic articles so that the size and size range of the pores, and the size and size range of the interconnections between the pores, can be more closely controlled than with currently available techniques.

It is still another object of this invention to provide an improved method to produce porous articles so that the volume percent of the porosity and the distribution of pores throughout the articles can be closely controlled.

It is further another object of this invention to provide an improved method to produce porous articles so that the porosity extends to and through the surface of the articles rather than forming a solid skin on the surface.

It is yet another object to provide a porous ceramic and metal articles in accordance with the above methods.

It is also another object to provide a method for producing a coated porous ceramic article which will retain its coating through a large number of thermal cycles.

SUMMARY OF THE INVENTION

In accordance with one form of this invention, there is provided a method for forming a porous article. A mixture of ceramic or metal particles and pliable organic spheres is prepared in a liquid. Preferably, a suspension of the particles and pliable organic spheres is formed. Preferably, the spheres are hollow and are made of a polymer, such as acrylic. The mixture is formed into a shaped article. The shaped article is dried. The shaped article is then fired so that the particles are bonded such as by sintering, and the pliable organic spheres are eliminated, resulting in voids in the shaped article. If the article is ceramic, the firing may take place in an oxygen rich atmosphere so that the organic spheres are eliminated primarily by oxidation. However, if the article is metal, the firing should take place in a very low oxygen environment to avoid oxidizing the metal and thus the organic spheres are substantially volatilized. That is, the organic compound disassociates and decomposes into gaseous species in order to avoid oxidation of the metal. To make it easier to volatilize the spheres, it is preferred that the spheres are low density, e.g., hollow.

In accordance with another form of this invention, there is provided another method for producing porous ceramic articles. A suspension of ceramic or metal particles and pliable organic hollow spheres are formed such that the particles and pliable hollow polymer spheres are simultaneously suspended in a liquid, preferably including water. A shaped article is formed, after a sufficient amount of water is added, either slip casting, pressing, extrusion, or injection molding. The shaped article is dried to remove the water. The shaped article is then fired to allow bonding of the particles such as by sintering, and to eliminate the pliable organic hollow spheres, resulting in uniformly distributed voids in the shaped article.

A range of porosities of up to 95% void volume may be achieved using these methods. The size of the voids may be preselected by selecting the appropriate size polymer spheres. The amount of porosity is easily controlled by the number of polymer spheres which are added. The size range of the pores can be closely controlled by controlling the size range of the polymer spheres which are used. The distribution of the pores in the article is highly uniform due to the fact that the polymer spheres and the particles are preferably simultaneously suspended by the addition of the appropriate suspending agent.

If the article is ceramic, it may be coated, for example with another ceramic composition. It has been found that the coating will stay bonded to the article through a large number of thermal cycles. Similar coatings on other substrates do not adhere as well.

In accordance with another form of this invention, there is provided a porous ceramic or metal article having a plurality of substantially spherical shaped voids. The voids are substantially uniformly dispersed throughout the article. The voids are interconnected with one another. For a ceramic article having a theoretical density in the range from 5% to 30%, the strength of the article is in the range from 700 psi to 4500 psi.

In another form of this invention, there is provided a porous ceramic or metal article having a plurality of substantially spherical shaped voids therein. The voids are substantially uniformly dispersed throughout the article. The voids are interconnected with one another. A substantial number of the voids intersect with at least one adjacent void. A window is formed by the intersection. The window is substantially in the shape of a circle. The average diameter of the circular windows is in the range from approximately 11 microns to 22 microns.

In accordance with another form of this invention, there is provided a porous ceramic article having a plurality of substantially spherical shaped voids therein. The voids are substantially uniformly dispersed throughout the article. The voids are interconnected with one another. At least a portion of the article is coated. The coating may comprise a ceramic composition, such as zirconia. The coating will remain adhered to the article for at least ten thermal cycles. The preferred thermal cycle is from approximately room temperature to approximately 2200° F. and back to approximately room temperature in approximately 2 hours.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 1:
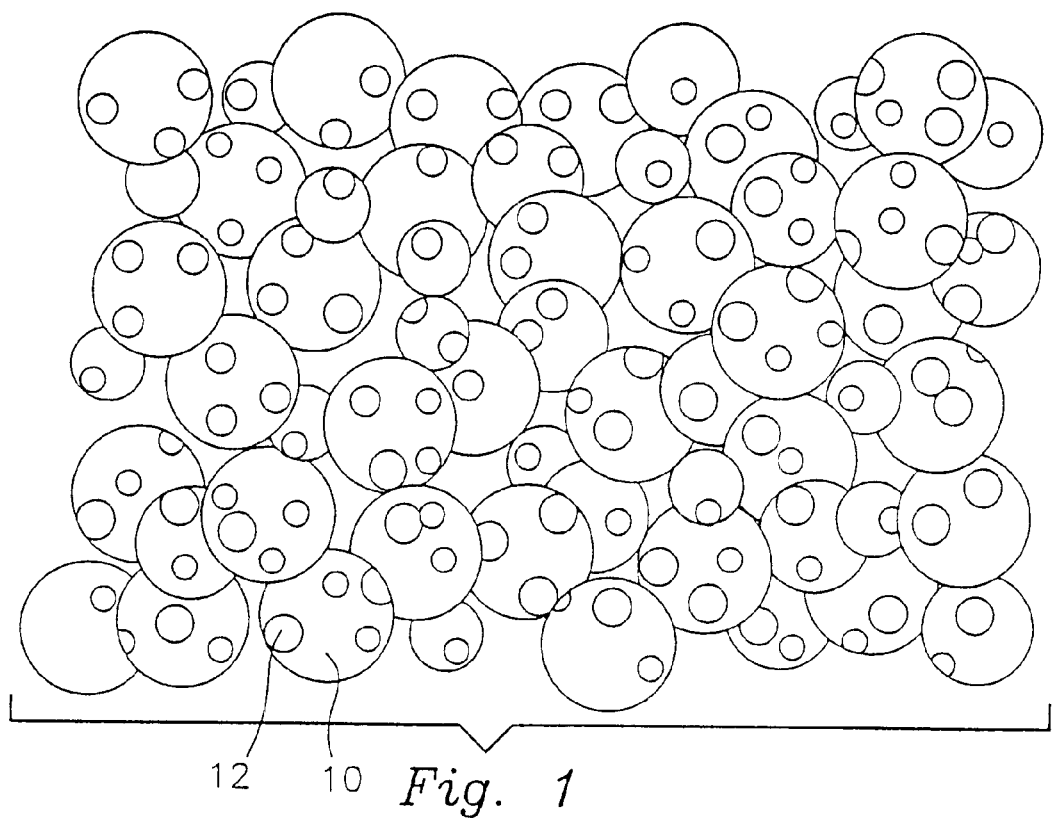
FIG. 1 is a sectional view of a portion of an article made in accordance with the subject invention, with the exposed side having been polished.

Porous ceramic articles were formed in accordance with the teaching of the invention as set forth in Examples 1–5 below.

EXAMPLE 1

A highly porous zirconia toughened alumina article was prepared by mixing 8.4 weight percent zirconia, 18.2 weight percent alumina with 16.1 weight percent water, 1.2 weight percent nitric acid, 4.3 weight percent starch, 1.1 weight percent petroleum jelly, and 0.8 weight percent pliable hollow polymer spheres. The polymer was acrylic. The average size of the spheres was 80 microns. These constituents were mixed in a Hobart mixer forming a paste with the consistency of bread dough. This mixture was then shaped by pressing in a mold, removed, dried and fired to form the porous ceramic article. The fired article was composed of 72% void volume. The average void size was approximately 80 microns and the voids were very uniformly distributed across the article. Scanning electron microscopy of the article revealed that the pores were highly connected. The average modulus of rupture of these articles with 72% void volume was approximately 4000 psi. Articles of this material have been cycled from room temperature to 2200° F. and back to room temperature in 1.75 hours. The dimensions of the article was approximately 3.25"×2.5"×0.25". After 100 of these thermal cycles, the average strength was still 4000 psi. This demonstrates the excellent thermal shock resistance of these materials. The ability of this material to be shaped in the green state by pressing in molds allows the readily available automatic forming equipment to be used to fabricate the desired articles. These automatic forming equipment not only allow parts to be molded in a short period of time, but also allow very economical production of the parts.

EXAMPLE 2

In another instance, the same procedure was used as in Example 1, except that the weight percent of pliable hollow polymer spheres which were used was increased. The resulting article was composed of 82% void volume with the result in the strength of approximately 2500 psi.

EXAMPLE 3

In another instance, the same procedure was used as in Example 2, except that the weight percent of pliable hollow polymer spheres were increased. The resulting article was composed of 88% void volume with the result in the strength of approximately 1500 psi.

EXAMPLE 4

A highly porous zirconia toughened alumina article was prepared by mixing 8.8 weight percent zirconia, 72 weight percent alumina with 17 weight percent water, 1.3 weight percent nitric acid, and 0.84 weight percent pliable hollow polymer spheres, and 0.1 weight percent of a defoaming agent. Additional water was then added to produce a slurry suitable for slip casting in plaster of paris molds using traditional slip casting techniques. Articles were formed by pouring the slip prepared as above in the plaster of paris molds and allowing suitable time for the molds to absorb the water. The cast parts were then taken from the mold, dried and fired. The average strength of these articles with 72% void volume was approximately 4000 psi. In general, all the physical properties were the same as those described for the pressed material described in Example 1.

EXAMPLE 5

A highly porous zirconia toughened mullite article was prepared by mixing 38.4 weight percent zircon (zirconium silicate), 44.6 weight percent alumina with 15 weight percent water, 1 weight percent nitric acid, 1 weight percent pliable hollow polymer spheres, and 0.01 weight percent of a defoaming agent. The amount of water added was sufficient to produce a slurry suitable for slip casting in plaster of paris molds using traditional slip casting techniques. Articles were formed by pouring the slip prepared as above in the plaster of paris molds and allowing suitable time for the molds to absorb the water. The cast parts were then taken from the mold, dried and fired. The articles formed were composed of approximately 70% void volume space.

EXAMPLE 6

In another instance, solid substantially non-pliable polymer spheres of approximately the same average size as the pliable hollow polymer spheres mentioned in Examples 1–5 were used as a comparison. These solid spheres, which are very hard, were mixed in exactly the same manner as Example 1, except the solid spheres were substituted for the hollow spheres (equal volume percentages of solid spheres were substituted for the hollow spheres to maintain the same fired density). The bodies were dried and fired in exactly the same manner as in Example 1. The measured MOR (strengths) of the sintered body using the solid spheres was only 1350 psi. As a comparison, this is only about one-third to one-half of the strengths obtained when using the pliable hollow spheres.

EXAMPLE 7

In another instance, a commonly used organic filler material, walnut flour, was used in place of the pliable hollow spheres. The proper amount of the walnut flour was determined which would give the same fired density articles as obtained in Example 1. The procedure followed was exactly the same as in Example 1, except the walnut flour was substituted for the pliable hollow spheres and additional water had to be added to make a body suitable for pressing. The articles made in this manner were dried and fired as in Example 1. The resulting articles underwent approximately 5 times the amount of shrinkage as those in Example 1 and were too weak to allow MOR testing to be performed.

Discussion

The preferred range for the volume percent of the hollow pliable polymer sphere for a porous article is between 50% and 95% void volume.

The preferred range for the size of the pliable hollow polymer spheres is between 1 micron and 1000 microns.

As can be seen by comparing the articles which were obtained by Examples 6 and 7 to those of the invention set forth in Examples 1–5, it is clear that the invention produces far superior ceramic articles. It is believed that the ceramic articles produced by the invention are stronger primarily because cracks do not form during the drying process, which it is believed is due to the fact that the pliable hollow spheres deform when the ceramic matrix contracts during drying.

This deformation does not occur when one uses hard solid substantially non-pliable spheres, as indicated in Example 6. It is believed that the strength of an article produced in accordance with this invention is in the range of 700 psi for a 5% theoretical density to 4500 psi for a 30% theoretical density. The strength is measured by supporting the article at the ends thereof and applying a force to the top of the article until the article breaks. Thus the ceramic articles produced by the invention have been shown to be much stronger than the prior art.

In addition, it is believed that the use of pliable hollow spheres enables paths between the resultant spherical voids to occur with more certainty because the adjacent hollow spheres do not have a mere single point of contact, as do hard spheres, but have a substantial area of contact so that connections between the resultant voids are more likely when the adjacent spheres deform.

Referring more particularly to FIG. 1, each spherical void 10 includes at least one substantially circular window 12 formed by the intersection of an adjacent spherical void 10. The average diameter of the circular windows 12 is in the range from approximately 11 microns to 22 microns.

Figure 2:
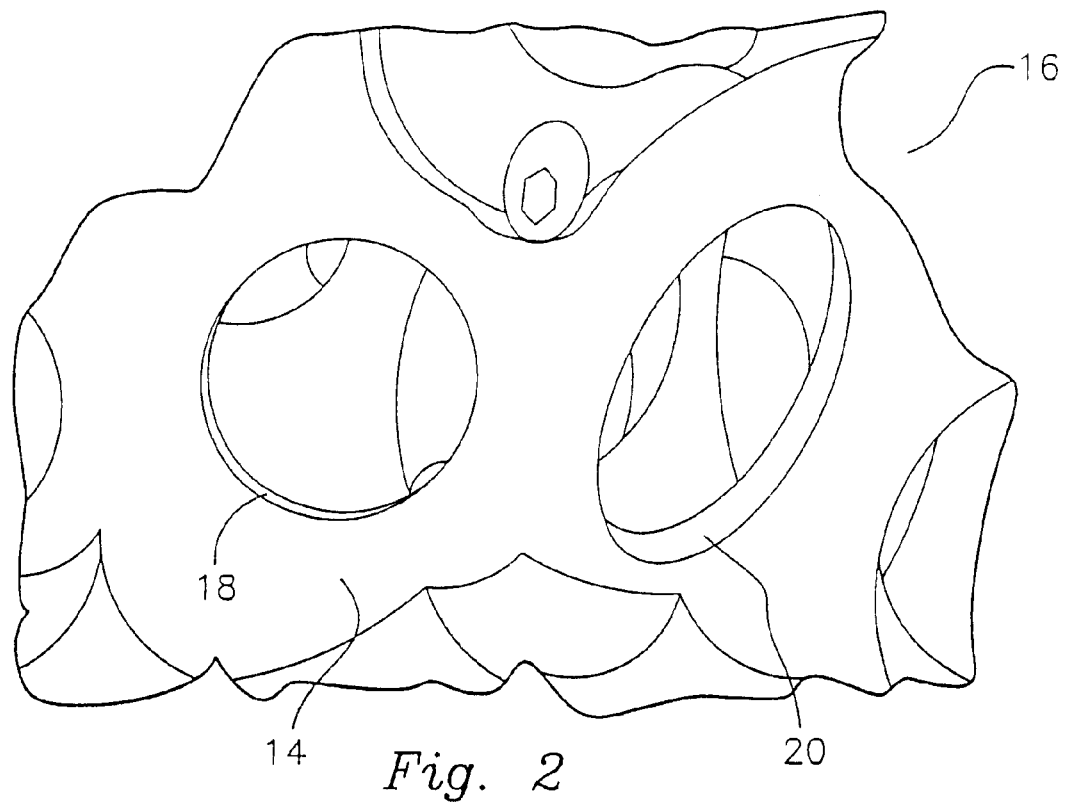
FIG. 2 shows a portion of FIG. 1, which has been magnified.

FIG. 2 shows intersecting spherical voids 14 and 16 having windows 18 and 20, respectively. The windows formed by the intersection of spherical voids 14 and 16 are hidden from view.

The article may have a coating applied. A coating is sometimes desirable for non-reactivity, hardness, impermeability, pore size control, and other characteristics. The coating may comprise a ceramic composition, such as zirconia. It has been found that a coating, when applied to the articles of the subject invention, will remain adhered to the article over a large number of thermal cycles, compared to prior art articles which have been similarly coated. It has been found that the coating began to peel off prior art articles after less than ten thermal cycles from approximately room temperature to approximately 2200° F. and back to approximately room temperature in approximately 2 hours. On the other hand, it has been found that the coating on an article of the subject invention remained adhered to the article after over 100 thermal cycles from approximately room temperature to approximately 2200° F. and back to approximately room temperature in approximately 2 hours.

Porous metal articles were formed in accordance with the teachings of the invention as set forth in Examples 8–10 below.

EXAMPLE 8

Polyvinyl alcohol (Avriol 165 manufactured by Airproduct Inc.) and hollow acrylic spheres (PM6545, PQ Corporation) were prepared in 6% and 20% aqueous solutions, respectively. The materials used to form the spheres were a mixture of 2-propenenitrile (polyacrylonitrile) and 2-methyl 2-propenenitrile (polymethacrylonitrile). Powdery FeCrALY metal (22 micron manufactured by Ultrafine Inc.), 6% PVA and 20% hollow spheres were measured at 70, 11.5 and 7.5 weight percentage, respectively, and were mixed in an aqueous solution by a Hobart mixer until it was uniform.

The mixture was cast as a thin film onto a carrier substrate. The thickness of the cast layer was metered by adjusting the gap between the doctor blade and the carrier. The thin sheet was dried in the air and fired at a controlled atmosphere at 2400° F.

The thickness of the sintered thin film was between 0.65 mm and 2 mm. The open porosity of this sintered body was between 50% to 90%.

EXAMPLE 9

Example 9 was conducted similarly with Example 8, except that a FeCrALY metal powder with a different particle size (44 micron manufactured by Ultrafine Inc.) was used. A similar thickness and porosity of the sintered metal article was obtained in this Example. However, the pore size distribution of the resulting sintered article was somewhat different from the samples prepared in Example 8.

A comparison of metal articles produced in accordance with Examples 8 and 9 is set forth in the chart below.

| AVERAGE POWDER SIZE | AVERAGE PORE SIZE | |
|---|---|---|
| | 1ST FIRING CYCLE | 2ND FIRING CYCLE |
| 22 Microns | 25.74 Microns | 21.14 Microns |
| 44 Microns | 38.7 Microns | 35.9 Microns |

EXAMPLE 10

The mixture can be prepared in the same manner as in Example 8, except a different binder (2.9% Kelzan) was used and the FeCrALY powder, 2.9% Kelzan and 20% hollow spheres were used at weight percentage of 78, 5 and 7, respectively. The dough mixture was charged in a mold and shaped by pressing. The pressed part was removed from the mold, dried and fired as in Example 8.

The thickness of the sintered body is larger than 2 mm. The open porosity of this sintered body was between 50% to 90%.

The preferred weight percent ranges of the materials used to form the slurry or dough in Examples 8–10 are set forth below.

| COMPONENTS | WEIGHT (%) |
|---|---|
| 20% Polymer Spheres | 0.05–8 |
| Metal Powder | 60–89 |
| 2.9% Kelzan or 6% PVA | 3–20 |
| Water | 0–40 |

The top firing temperature for a given metal article is usually at the 80% to 96% of the melting point of metal. The firing should be done in a low oxygen environment to avoid oxidation of the metal.

Typical three point bending strength of stainless steel sample are as follow:

| SAMPLE | MOR (psi) | % |
|---|---|---|
| GS002 | 6988.57 | 23.66 |
| GS003 | 5409.73 | 24.15 |
| GS004 | 5702.97 | 33.03 |
| GS005 | 4470.79 | 31.19 |

In Examples 8–9 above, the mixture of metal powder, hollow spheres and other additives is made into a slurry and cast on a carrier substrate in a process commonly called tape casting. By changing the binders and/or the total solids content, other forming methods can be employed. For example, by making the mixture into a thicker dough rather than a castable slurry, extruded tubes of the mixture may be formed. Similarly, as shown in Example 10, parts could be ram pressed or slip cast. The choice of forming method depends mostly on the geometry of the part desired.

Any metal which can be obtained as a powdered metal and which can be at least partially sintered may work in this process. In addition, some metals, such as copper, may be formed from their oxides and then reduced to the metal during the heat treating/sintering step. Metals of particular interest include steel and steel alloys, stainless steel, copper, brass, bronze, aluminum, aluminum alloys, titanium, chromium, nickel and FeCrALY.

The fact that the spheres are hollow is more important in the metal version because the metal article should be fired in a low oxygen environment to avoid oxidizing the metal. The spheres will not burn in a low oxygen environment and thus must be volatilized. Hollow spheres have much less mass than solid spheres and are easier to substantially completely volatilize.

Resiliency of the organic spheres is also important to prevent cracking of the article during firing for both the ceramic and metal versions. The resiliency of the hollow acrylic polymer microspheres was compared with polystyrene spheres. A cylindrical tube was filled with spheres and put under pressure using an Instron strength-testing machine. Both polystyrene spheres and polymer microspheres were evaluated.

The first experiment was performed in order to determine the force necessary to compress the spheres. Water was added to the polymer microspheres so that the mixture was 20% spheres by weight. This was done so that the spheres were more manageable and more easily contained. It was not necessary to add water to the polystyrene spheres. As the load was applied to the 80 gram plunger, the load and the corresponding volume of spheres were recorded.

The second experiment involved placing the spheres under a load of 40 pounds and then increasing the force to 62 pounds and then releasing the load on the plunger and recording the volume increase. The volume of the spheres at 40 pounds was used as 100% volume for comparison between the two types of spheres. The volume at a force of 40 pounds was used as a starting point for comparison since it was not possible to ascertain whether the spheres were closely packed and, therefore, the true starting volume could not easily be identified.

The polymer microspheres were more easily compressed than the polystyrene at forces less than 13 pounds, but gradually showed more resistance as the force was increased. In addition, the polymer microspheres regained 102% of the marked volume at 40 pounds after compression to 62 pounds, while the polystyrene spheres only regained 87% of the volume marked at 40 pounds. Both of the experiments indicate that the polymer microspheres have a higher resiliency than the polystyrene.

Up to the heat treatment stage, the processing of the metal version is substantially the same as the ceramic version. There may be minor differences in the optimum amount and type of binder. During the heat treating stage for the metal version, the hollow spheres are removed by volatilization or oxidation. In the volatilization, the organic compounds dissociate and decompose into gaseous species at high temperature and low pressure and may be removed by using a vacuum or by gas sweeping.

There are numerous applications of porous metal articles of the subject invention, such as catalyst substrates, catalysts, particulate trap, filters, diffusion layers, electrical conductors, heat exchanger components, wicks for heat pipes, wicks for burners, radiant burner surfaces, diffusion layers for introducing fuel or water into an air stream and bipolar plates in fuel cells. The porous metal may be used as a catalyst substrate by depositing a catalytic metal directly on the part, or by first depositing a wash coat of high surface area oxide on the part, then applying the catalyst onto the wash coat. The catalysts types include oxidation catalyst, selective oxidation catalysts, partial oxidation, steam reforming, water gas shift, desulfurization, hydrogenation, and hydro-desulfurization.

From the foregoing description of the preferred embodiments of the invention, it will be apparent that many modifications may be made therein. For example, in the ceramic version, porous ceramic articles can be made using other ceramic compositions, such as oxides, carbides or nitrides of silicon, aluminum and zirconium, as well as mullite, cordierite or a mixture thereof. It will be understood, however, that the embodiments of the invention are exemplifications of the invention only and that the invention is not limited thereto. It is to be understood, therefore, that it is intended in the appended claims to cover all modifications as fall within the true spirit and scope of the invention.

What is claimed is:

1. A method for forming a porous article comprising the steps of:
   preparing a mixture of particles and hollow pliable resilient organic polymer spheres in a liquid; said particles made from metal; said metal particles are made from a metal selected from the group consisting of steel and steel alloys, stainless steel, copper, brass, bronze, aluminum, aluminum alloys, titanium, chromium, nickel, and FeCrALY; said spheres having average diameters between 1 micron and 1000 microns;
   forming the mixture into a shaped article;
   drying the shaped article;
   firing the shaped article, wherein the particles are bonded and the hollow pliable organic polymer spheres are eliminated, resulting in voids having average diameters between 1 micron and 1000 microns in the shaped article; whereby a substantial number of voids form intersections with at least one adjacent void and circular windows are formed at the intersections.

2. A method as set forth in claim 1, wherein said liquid comprises water.

3. A method as set forth in claim 1, further including the step of suspending the particles and pliable resilient organic spheres in the liquid.

4. A method as set forth in claim 3, further including the step of adding a suspending agent for aiding in the formation of the suspension.

5. A method as set forth in claim 1, wherein said shaped article is formed by slip casting.

6. A method as set forth in claim 1, wherein said shaped article is formed by pressing.

7. A method as set forth in claim 1, wherein said shaped article is formed by extrusion.

8. A method as set forth in claim 1, wherein said shaped article is formed by injection molding.

9. A method as set forth in claim 1, wherein the void volume of the shaped article after firing is less than 95%.

10. A method as set forth in claim 1, wherein said pliable resilient organic spheres are made of acrylic.

11. A method as set forth in claim 1, further including the step of coating a portion of the article.

12. A method for forming a porous article comprising the steps of:
    preparing a mixture of particles and pliable resilient organic hollow polymer spheres in a liquid; said particles made from metal; said metal particles are made from a metal selected from the group consisting of steel and steel alloys, stainless steel, copper, brass, bronze, aluminum, aluminum alloys, titanium, chromium, nickel, and FeCrALY; said spheres having average diameters between 1 micron and 1000 microns
    forming the mixture into a shaped article;
    drying the shaped article;
    firing the shaped article, wherein the particles are bonded and the pliable organic hollow polymer spheres are burned off, resulting in interconnected voids having average diameters between 1 micron and 1000 microns in the shaped article, whereby a substantial number of voids form intersections with at least one adjacent void and circular windows are formed at the intersections.

13. A method as set forth in claim 12, wherein said liquid comprises water.

14. A method as set forth in claim 12, further including the step of suspending the particles and pliable resilient organic hollow spheres in the liquid.

15. A method as set forth in claim 14, further including the step of adding a suspending agent for aiding in the formation of the suspension.

16. A method as set forth in claim 12, further including the step of adding an amount of water prior to drying; and wherein said shaped article is formed by slip casting.

17. A method as set forth in claim 12, wherein said shaped article is formed by pressing.

18. A method as set forth in claim 12, wherein the void volume of the shaped article after firing is less than 95%.

19. A method as set forth in claim 12, wherein said pliable resilient organic hollow spheres are made of acrylic.

20. A method as set forth in claim 12, wherein a slurry containing the particles is formed first and then the pliable organic hollow spheres are added to the slurry.

21. A method as set forth in claim 12, wherein the mixture is in the form of a substantially viscous paste.

22. A method as set forth in claim 12, further including the step of coating at least a portion of the article.

23. A method for forming a porous metal article comprising the steps of:
    preparing a mixture of metal particles and pliable organic spheres in a liquid;
    the metal particles are selected from the group consisting of steel and steel alloys, stainless steel, copper, brass, bronze, aluminum, aluminum alloys, titanium, chromium, nickel and FeCrALY;
    forming the mixture into a shaped article;
    drying the shaped article;
    firing the shaped article in a low oxygen environment, wherein the metal particles are bonded and the pliable organic spheres are substantially volatilized, resulting in voids in the shaped article.

24. A method as set forth in claim 23, wherein said liquid comprises water.

25. A method as set forth in claim 23, further including the step of suspending the metal particles and pliable organic spheres in the liquid.

26. A method as set forth in claim 25, further including the step of adding a suspending agent for aiding in the formation of the suspension.

27. A method as set forth in claim 23, wherein said shaped article is formed by slip casting.

28. A method as set forth in claim 23, wherein said shaped article is formed by pressing.

29. A method as set forth in claim 23, wherein said shaped article is formed by extrusion.

30. A method as set forth in claim 23, wherein said shaped article is formed by injection molding.

31. A method as set forth in claim 23, wherein the void volume of the shaped article after firing is less than 95%.

32. A method as set forth in claim 23, wherein said pliable organic spheres are hollow.

33. A method as set forth in claim 23, wherein said pliable organic spheres are made of acrylic.

34. A method as set forth in claim 23, wherein said spheres range in diameter from 1 micron to 1000 microns.

35. A method for forming a porous metal article comprising the steps of:

preparing a mixture of metal particles and pliable resilient organic hollow spheres in a liquid;

the metal particles are made from the material taken from the group consisting of steel and steel alloys, stainless steel, copper, brass, bronze, aluminum, aluminum alloys, titanium, chromium, nickel and FeCr and alloys thereof;

forming the mixture into a shaped article;

drying the shaped article;

firing the shaped article, wherein the metal particles are bonded and the pliable organic hollow spheres are substantially volatilized, resulting in voids in the shaped article.

36. A method as set forth in claim 35, wherein said liquid comprises water.

37. A method as set forth in claim 35, further including the step of suspending the metal particles and pliable resilient organic hollow spheres in the liquid.

38. A method as set forth in claim 37, further including the step of adding a suspending agent for aiding in the formation of the suspension.

39. A method as set forth in claim 35, further including the step of adding an amount of water prior to drying; and wherein said shaped article is formed by slip casting.

40. A method as set forth in claim 35, wherein said shaped article is formed by pressing.

41. A method as set forth in claim 35, wherein the void volume of the shaped article after firing is less than 95%.

42. A method as set forth in claim 35, wherein said pliable resilient organic hollow spheres are made of acrylic.

43. A method as set forth in claim 35, wherein said pliable organic hollow spheres range in diameter from 1 micron to 1000 microns.

44. A method as set forth in claim 35, wherein a slurry containing the metal particles is formed first and then the pliable organic hollow spheres are added to the slurry.

45. A method as set forth in claim 35, wherein the mixture is in the form of a substantially viscous paste.

46. A method as set forth in claim 35, wherein said ceramic particles and pliable organic hollow spheres are simultaneously suspended in the liquid.

\* \* \* \* \*